H. A. WRENN AND J. X. PHILLIPS, Jr.
CHANGE MAKING DEVICE.
APPLICATION FILED MAY 22, 1920.
1,409,990.
Patented Mar. 21, 1922.
7 SHEETS—SHEET 1.
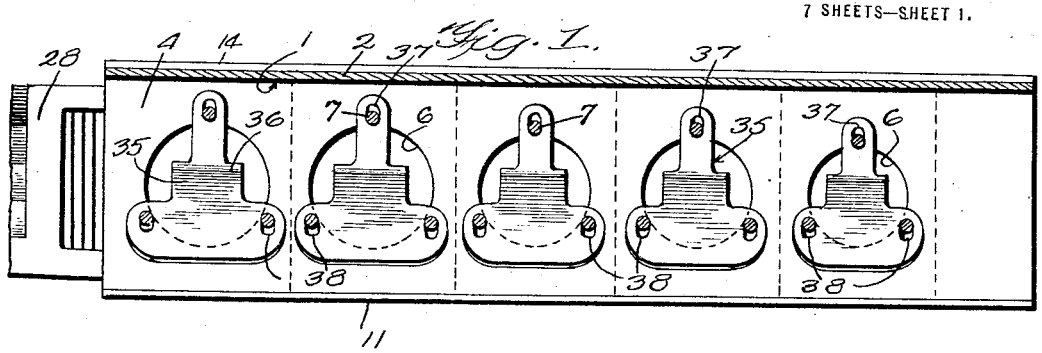
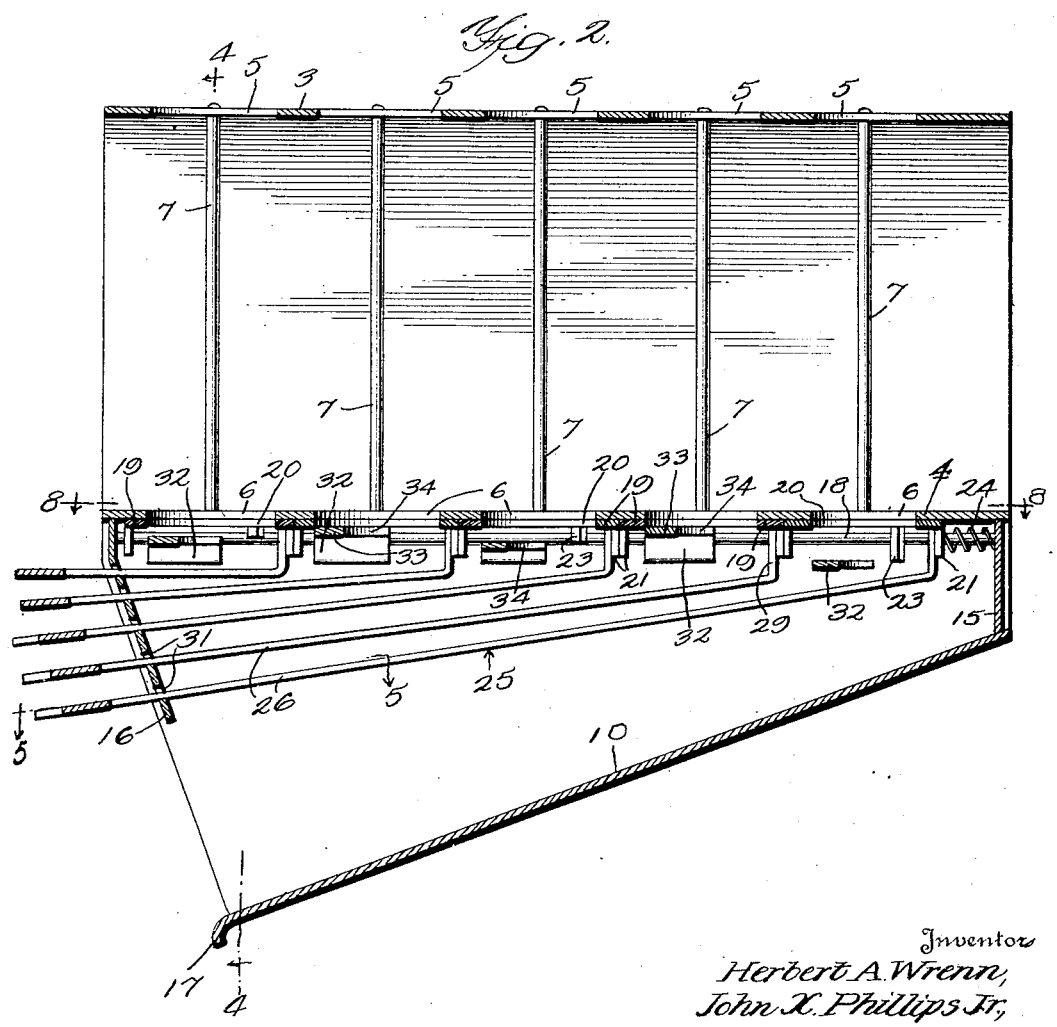
Inventors
Herbert A. Wrenn,
John X. Phillips Jr.,
By
Chr. Parken   Attorney

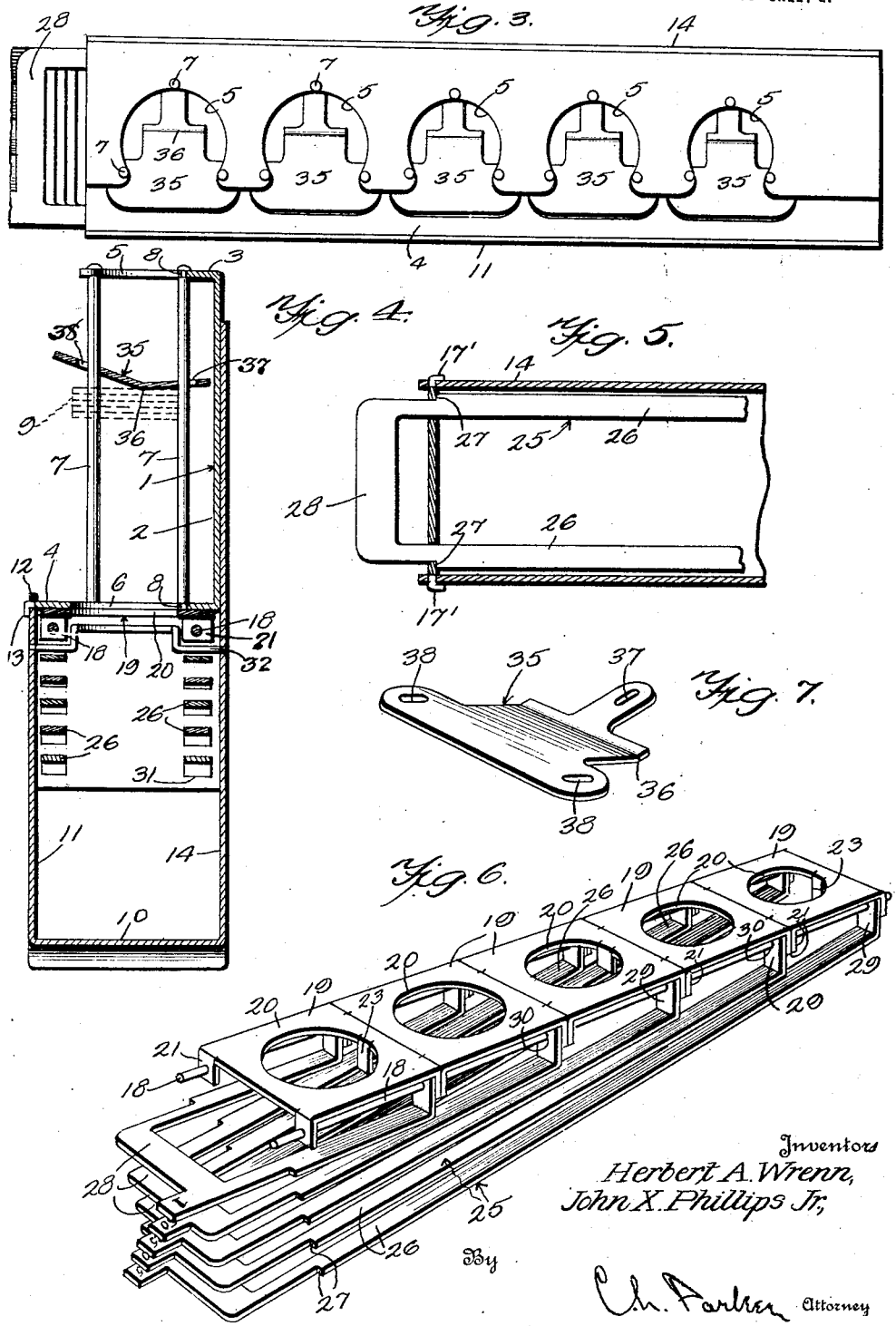

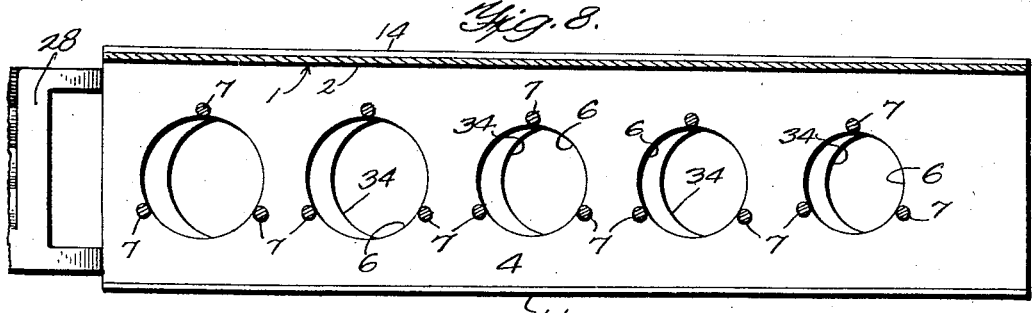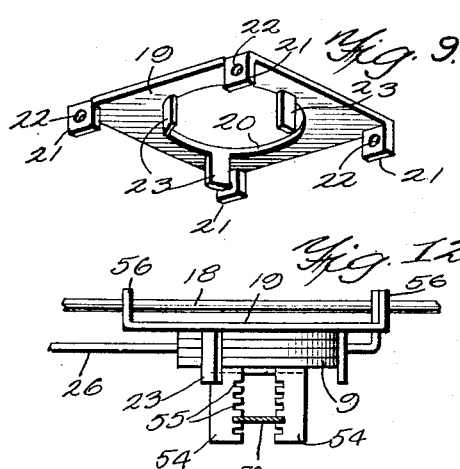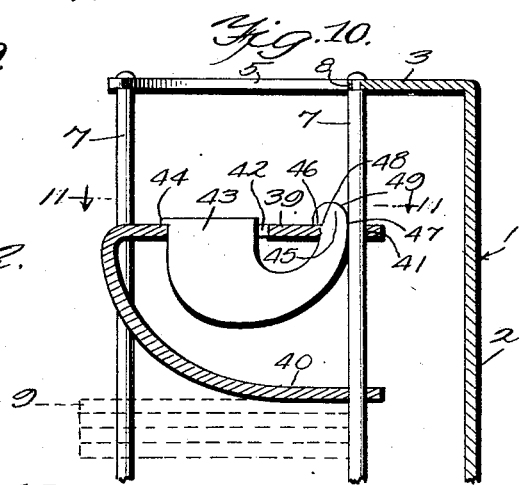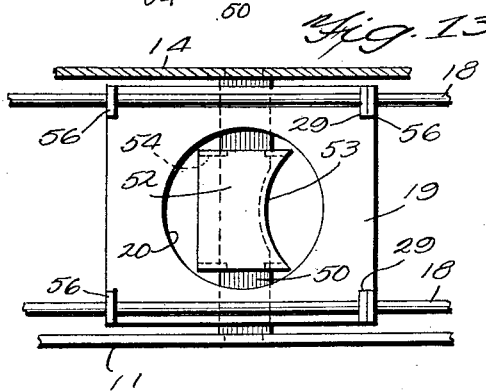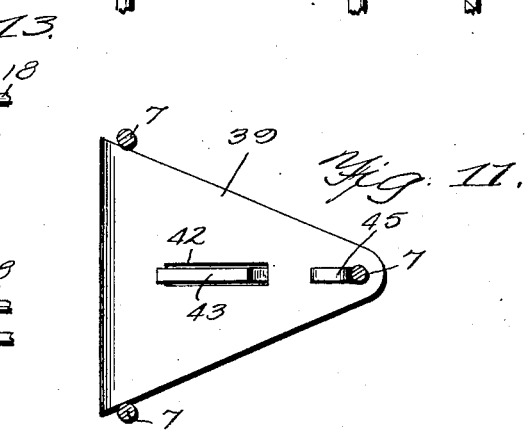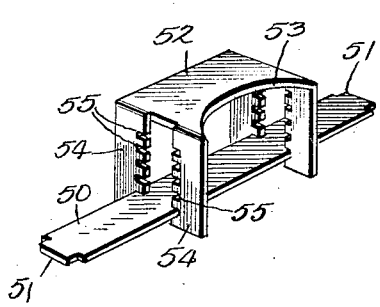

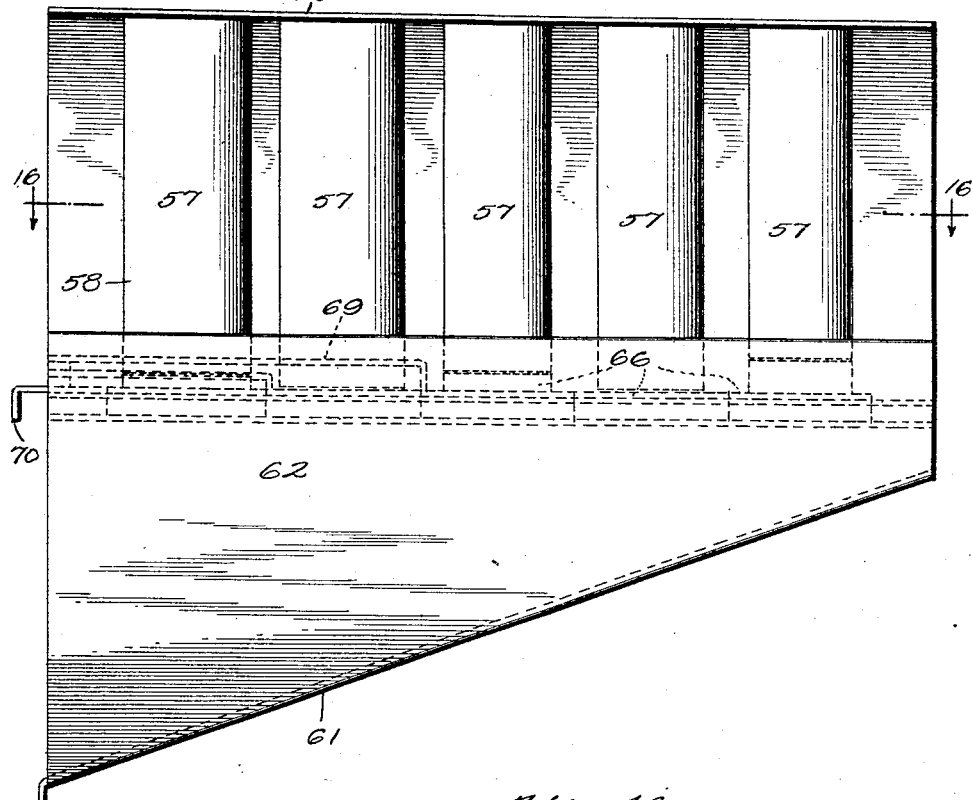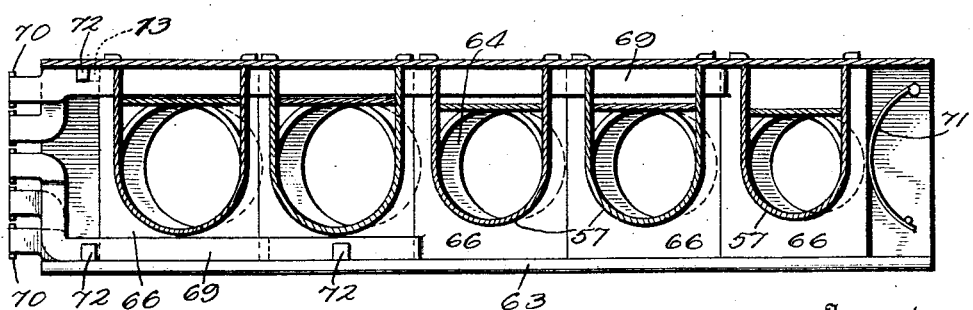

H. A. WRENN AND J. X. PHILLIPS, Jr.
CHANGE MAKING DEVICE.
APPLICATION FILED MAY 22, 1920.
1,409,990.
Patented Mar. 21, 1922.
7 SHEETS—SHEET 5.
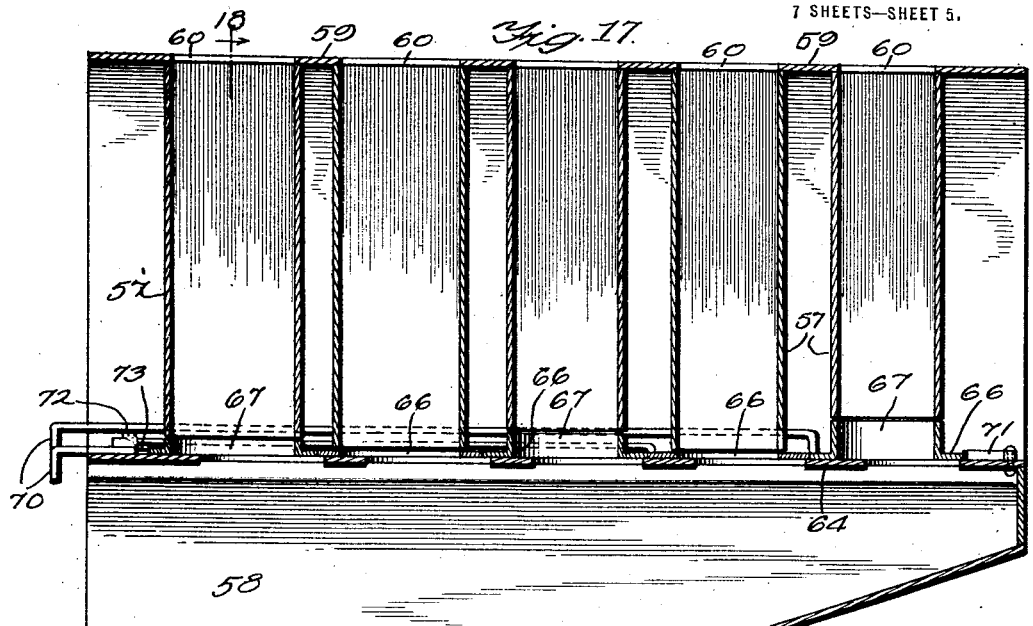
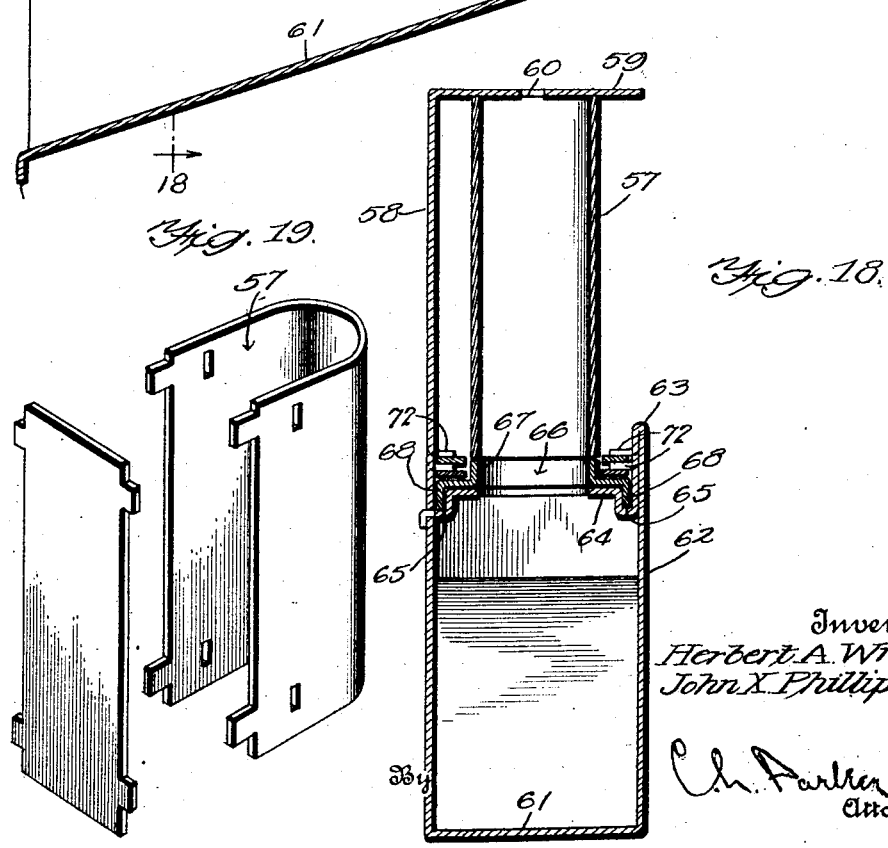
Inventors
Herbert A. Wrenn,
John X. Phillips Jr.,
By
Attorney

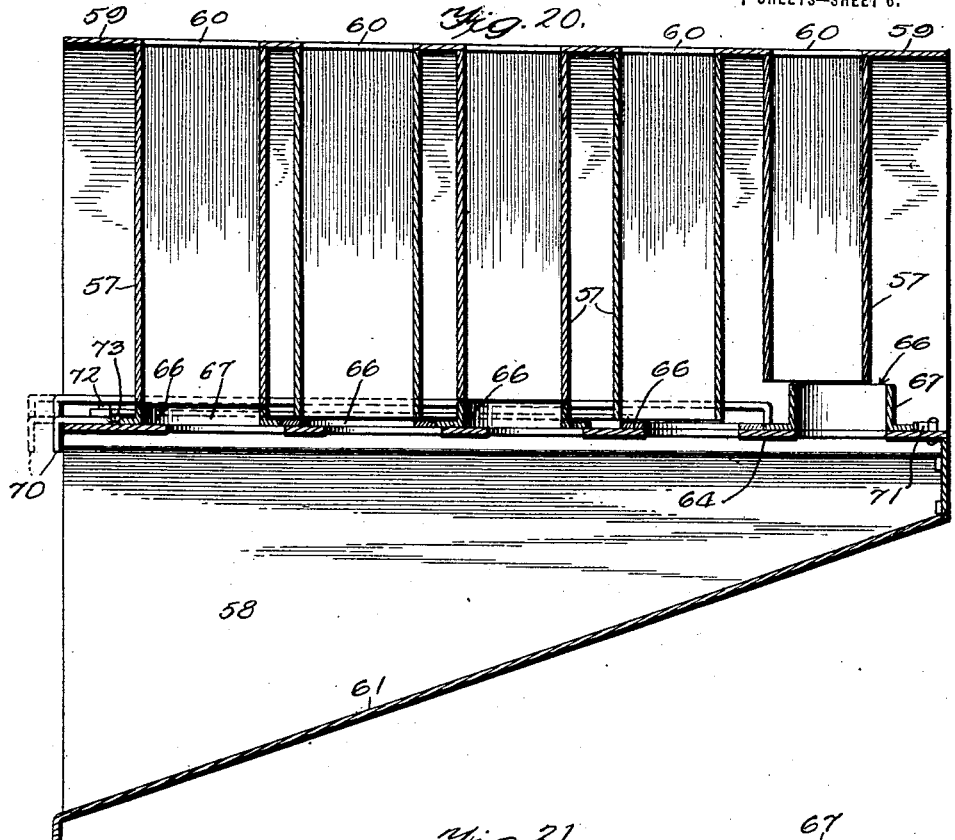
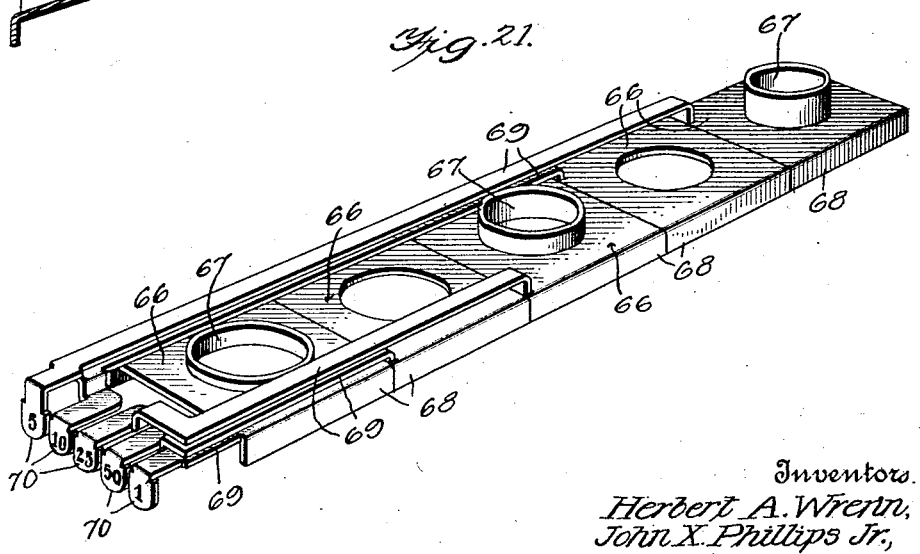

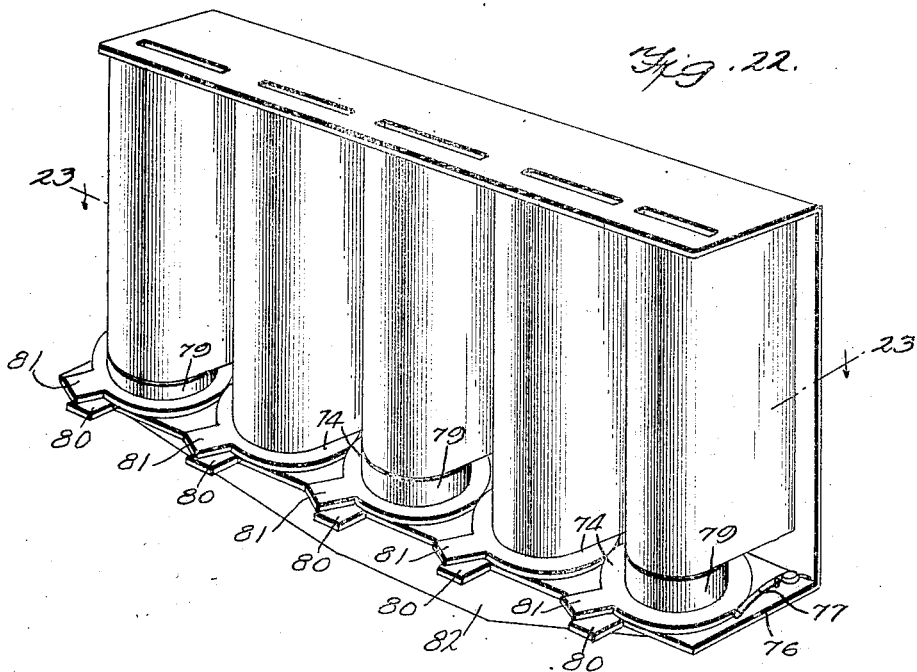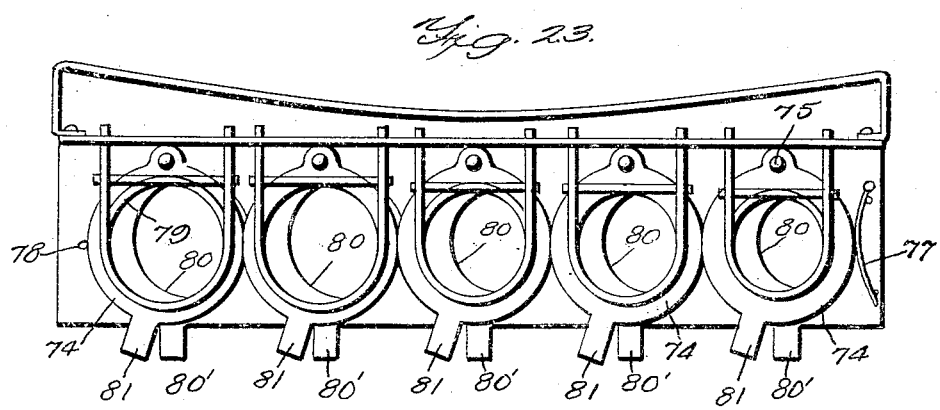

UNITED STATES PATENT OFFICE.

HERBERT A. WRENN AND JOHN X. PHILLIPS, JR., OF WASHINGTON, DISTRICT OF COLUMBIA, ASSIGNORS OF TWENTY-ONE AND ONE-THIRD ONE-HUNDREDTHS TO PETER M. DORSCH, TWENTY-ONE AND ONE-THIRD ONE-HUNDREDTHS TO HERBERT A. WRENN, TWENTY-ONE AND ONE-THIRD ONE-HUNDREDTHS TO J. BARRETT CARTER, EIGHTEEN ONE-HUNDREDTHS TO C. L. PARKER, AND EIGHTEEN ONE-HUNDREDTHS TO JOHN X. PHILLIPS, JR., ALL OF WASHINGTON, DISTRICT OF COLUMBIA.

CHANGE-MAKING DEVICE.

1,409,990.  Specification of Letters Patent.  Patented Mar. 21, 1922.

Application filed May 22, 1920. Serial No. 383,480.

*To all whom it may concern:*

Be it known that we, HERBERT A. WRENN and JOHN X. PHILLIPS, Jr., citizens of the United States, residing at Washington, in the District of Columbia, have invented certain new and useful Improvements in Change-Making Devices, of which the following is a specification.

This invention relates to improvements in change making devices.

An important object of the invention is to provide a device of the above mentioned character which is of simplified construction and adapted for use by street car conductors, news boys and the like, whereby change may be obtained quickly and easily, thereby effecting a great saving in time.

A further object of the invention is to provide such a device which will be light in weight and compact, so that it can be attached to the belt, or otherwise carried by the user.

A further object of the invention is to provide such a device which may be readily operated with one hand.

A further object of the invention is to provide means for properly seating the coins one upon another so that the coin cutting members may work easily and accurately.

A further object of the invention is to provide adjustable means whereby the full change for a given coin may be obtained, or a given amount subtracted therefrom, such as the price of a newspaper, or the amount of a street car fare.

Other objects and advantages of the invention will be apparent during the course of the following description.

In the drawings, forming a part of this specification, wherein like numerals are employed to designate like parts throughout the same, Figure 1 is a horizontal sectional view through the device taken above the clutch member.

Figure 2 is a central vertical longitudinal sectional view through the device.

Figure 3 is a plan view thereof.

Figure 4 is a section taken on the line 4—4 of Figure 2.

Figure 5 is a section taken on the line 5—5 of Figure 2.

Figure 6 is a detached perspective of the coin cutting members, bearing rods, and actuating keys.

Figure 7 is a perspective of one of the clutch members.

Figure 8 is a section taken on the line 8—8 of Figure 2.

Figure 9 is a perspective of one of the coin cutting members.

Figure 10 is a transverse vertical section through a portion of the device showing a modified form of clutch member.

Figure 11 is a section taken on the line 11—11 of Figure 9.

Figure 12 is a detail view showing a modified form of the coin stack supporting member.

Figure 13 is a fragmentary horizontal sectional view showing the same.

Figure 14 is a detail perspective of a modified form of coin stack supporting member showing the adjustable means therefor.

Figure 15 is an elevation of a modified form of the device.

Figure 16 is a section taken on the line 16—16 of Figure 15.

Figure 17 is a central vertical longitudinal sectional view through a modified form of the device.

Figure 18 is a section taken on the line 18—18 of Figure 17.

Figure 19 is a detail perspective of the coin stack containing member and back plate used in the modified form.

Figure 20 is a sectional view similar to Figure 17 showing two of the coin cutting members in the shifted position.

Figure 21 is a detail perspective of the coin cutting members and associated elements used in the modified form.

Figure 22 is a perspective of a second modification of the device, and

Figure 23 is a section taken on the line 23—23 of Figure 22.

Referring to Figures 1 to 9 inclusive, the numeral 1 designates the body portion of the device which comprises a rear section 2 and top and bottom sections 3 and 4. The top section 3 and bottom section 4 are provided with openings 5 and 6 respectively, circular in shape and corresponding in size to the coins to be inserted in the individual stacks.

Each opening 5 is disposed in axial alinement with the corresponding opening 6. A plurality of rods 7 is mounted adjacent each set of openings 5 and 6, and have their ends reduced for insertion within openings 8 in the top and bottom sections 3 and 4 of the body portion. The rods 7 are preferably formed of polished steel, and their inner faces are flush with the faces of the openings 5 and 6. The rods 7 are arranged in sets and the rods of each set are preferably equidistantly spaced and are adapted to contain coin stacks 9 therebetween.

Mounted below the body portion 1 is a coin chute 10 which slopes downwardly toward one end of the machine, as shown in Figure 2. The chute has a front section 11 preferably formed integral therewith, the front section being provided with openings 12 for the reception of downturned lips 13 formed on the front of the bottom section 4 of the body portion 1. The chute 10 also has a rear section 14, secured to the rear wall 2 of the body portion in any suitable manner such as by rivets or the like. The rear section 14 preferably extends upwardly the greater portion of the height of the rear wall 2 of the body portion, so that the connection between the body portion and the chute is extremely rigid. The reduced end of the chute is closed by an end plate 15, while the opposite end is provided with an end plate 16. The end plates 15 and 16 may be secured to the front and rear walls of the chute by any suitable means, such as lips 17′ Figure 5. The lower end of the plate 16 is spaced from the bottom of the chute, as shown in Figure 2, to provide a space for the passage of the coins. The lower end of the bottom of the chute extends slightly beyond the walls thereof and is downturned to form a lip 17 for a purpose to be described.

A pair of bearing rods 18 preferably formed of polished steel is mounted below the bottom section 4 of the body portion and on opposite sides of the openings 6. These rods are mounted longitudinally of the device and have their ends secured to the end plates 15 and 16.

Mounted below each of the openings 6, is a slidable coin cutting member 19. The members 19 are preferably formed of sheet metal and are provided substantially centrally thereof with openings 20 corresponding in size to the coins in the individual stacks. In the normal position of the slidable members of the device, the openings 20 are in registration with the openings 6. Depending lips 21 are formed on opposite sides of the ends of the members 19, and are provided with openings 22 Figure 9 to receive the bearing rods 18. A plurality of depending lips 23 is provided adjacent each of the openings 20, and have their inner faces flush therewith. The length of the lips 23 varies according to the number of coins to be cut from each coin stack. As clearly shown in Figures 2 and 6, the members 19 contact through the entire length of the machine, for a purpose to be described. Coil springs 24 are mounted in one end of the device and surround the rods 18 adjacent the ends thereof. As shown in Figure 2, these springs are arranged between the end plate 15 and the adjacent lips 21 of the coin cutting members 19. It will be obvious that the springs 24, acting against the end lips 21, will move all of the coin cutting members 19 to their outermost position, since the members 19 are in contact throughout the length of the machine.

Actuating members 25 are provided, each of which embodies parallel arms 26. The arms 26, at points spaced from their ends, are provided with shoulders 27 for a purpose to be described. The outer ends of the arms 26 are connected by cross pieces 28 which form operating keys. The actuating members 25 preferably converge upwardly and the inner ends of the individual arms 26 terminate in upturned lips 29, which are provided with openings adapted to receive the bearing rods 18. Each pair of lips 29 preferably contact with one pair of lips 21 of the coin cutting members. The end plate 16 is provided with openings 31 through which the outer ends of the arms 26 extend. The shoulders 27 are adapted to contact with the inner face of the plate 16, as shown in Figure 5 to limit the outward movement of the members 19.

Coin stack supporting members 32 are mounted beneath the openings 6 and 20. Each of the members 32 consists of a body portion 33 provided with a cutout portion 34. The cutout portions 34 are arcuate in shape and so arranged that they will be in axial alinement with the openings 20 when the coin cutting members 19 are shifted to their innermost positions. Several of the members 32 have their ends turned downwardly and outwardly as shown in Figure 4 to provide clearance for the lips 21 of coin cutting members.

In order that the device may properly function, it is desirable that the coins properly seat on one another within the stacks 9 and we have accordingly provided a clutch member 35 bent on a line 36 adapted to seat upon the tops of the individual coin stacks. The rear end of the member 35 is provided with an opening 37 for the reception of the rear rod 7, while the forward end flares outwardly as shown in Figure 7, and is provided with openings 38 for the reception of the front rods 7. The openings 37 and 38 are preferably elongated. The bend 36 is preferably located rearwardly of the center of the coin stack and the forward end of the member 35 slopes upwardly more than the rear end thereof, so that the openings 38 are above the openings 37. Thus it will be seen that the distance between the openings 38 and the opening 37 is greater than the horizontal distance between the front rods 7 and the rear rod 7. If the coins in the stack 9 partake of any movement, due to the jolting or jarring of the device, the coins, contacting the member 35 at the bend, will raise the rear portion of the clutch member 35 so that the inner ends of the openings 38 and 37 will grip against the rods 7 and prevent the coins from turning up on end or otherwise becoming unseated with respect to each other. As coins are cut from the bottom of the stack, the rear end of the member 35 drops first, due to the contact line 36 being disposed rearwardly of the center of the coins, and the elongation of the openings 37 and 38 permits the tilting downwardly of the rear end of the clutch member, so that it will slide downwardly about the rods 7 and maintain contact with the uppermost coin of the stack. Instead of inserting coins singly from the top of the stack, as in the present form of coin holders in use, a plurality of coins may be inserted beneath the clutch member 35 and between the front rods 7 by tilting the coins slightly and pushing inwardly against the member 35. The elongation of the openings 37 and 38 permits the raising of the front portion of the clutch member 35.

In Figures 10 and 11, we have illustrated a modified form of clutch member which may be used in place of the member 35. This form of clutch comprises an upper substantially horizontal triangular portion 39 and a lower curved portion 40, bent as shown in Figure 10. The portion 40 engages the top of the coin stack rearwardly of the center thereof, as does the bend 36 of the clutch member 35. The outer edges of the upper portion 39 are adapted to loosely contact with the front rods 7, while the rear end thereof is provided with an elongated opening 41 to slidably receive the rear rod 7. An opening 42 is provided approximately centrally of the member 39 to receive the forward end 43 of a locking key. A lip 44 is formed on the forward end of the locking key which seats upon the upper face of the member 39. The inner end 45 of the locking key is curved as shown and extends through the forward portion of the opennig 41. The end 45 has a shoulder 46 contacting with the upper face of the portion 39. The inner edge 47 of the end 45 normally slidably contacts with the inner rod 7. The distance between the inner edge 48 of the opening 40 and the curve 49 is greater than the horizontal distance between the edge 48 and the rear rod 7. Thus it will be seen that if the upper coin of the stack is disturbed, it will jar the lower end 40 of the clutch causing the end 43 of the key to rise so that the rear end 45 of the key acts as a clutch to grip the rear rod 7 to prevent further raising of the clutch member and hence prevent the unseating of the coins.

In Figures 12, 13, and 14, we have illustrated a modified form of coin stack supporting means whereby the number of coins to be cut from the stack can be regulated as desired. A horizontal member 50 is provided, arranged transversely of the walls of the chute as shown in Figure 13. The member 50 is provided upon its ends with lips 51 adapted to extend through openings in the walls of the chute whereby it may be secured in position. A coin supporting member 52 is provided having an arcuate cutout portion 53 similar to the cutout portion 34 of the members 32. A pair of depending arms 54 is arranged on opposite sides of the member 52, and these are provided with slots 55 for the reception of the horizontal member 50. The member 52 is preferably formed of resilient metal so that the arms 54 may be spread apart to permit the insertion of the member 50 within any of the slots 55, whereby the number of coins cut from the bottom of the stack may be regulated. When this form of coin stack supporting means is employed, we preferably provide the coin cutting member 19 with upturned lips 56 for the reception of the bearing rods 18, openings being cut in the plate 19 whereby the ends 29 of the actuating members 25 may extend through the plate 19 to receive the rods 18.

In Figures 15 to 21 inclusive, we have illustrated a modified form of the device wherein we employ solid substantially inverted U-shaped coin containing members 57 carried by the body portion 58 of the device. In this form of the device, the body portion and the chute are preferably formed of a single sheet of metal as shown in Figure 18, the upper end being bent outwardly to form a top 59 provided with a coin slot 60, the lower end of the body portion being bent outwardly to form a chute 61, and upwardly to form a front portion 62. The front portion 62 is bent back upon itself at 63 and across the machine to form a base plate 64. The base plate is also bent to form channels 65 for a purpose to be described.

Coin cutting members 66 are mounted below the members 57, several of the members 66 being provided with upstanding flanges 67, the height of which depends upon the number of coins to be cut from the stack. The front and rear edges of the members 66 are downturned to form flanges 68 adapted to be slidably mounted within the channels 65.

As shown in Figure 21, the members 66 are provided with preferably integral actuating members 69 extending toward the outlet end of the chute and provided with keys 70. The keys 70 may be stamped with numbers indicating the amount of change to be obtained by pressing the individual keys.

Transverse edges of the members 66 contact throughout the length of the machine. A spring 71 Figure 16 is mounted upon the base plate 64 and contacts with the outer edge of the adjacent coin cutting member 66 to normally move all of the members 66 to the outermost position, so that the openings 67 register with the coins within the containing members 57.

Lips 72 Figures 16 and 18 are stamped out of the body portion to form guides for the members 69, one of these lips, as at 73, serving as a stop to limit the outward movement of the coin cutting members 66.

In Figures 22 and 23, we have illustrated a still further modification of the device, in which we employ a series of contacting pivoted coin cutting members 74, pivoted as at 75 to the base plate 76. A spring 77, mounted upon the base plate 76 serves to maintain the members 74 in the normal position beneath the coin containing members, and a pin 78, mounted in the opposite end of the base plate, serves to limit the movement of the members 74. Several of the members 74 are provided with upstanding flanges 79, the height of which depends upon the number of coins to be cut from the stacks. The base plate 76 is provided with openings 80, offset with respect to the openings in the member 74 when the latter are in the normal position.

Lips 80' are formed on the forward edge of the base plate 76 and a second set of lips 81 are formed upon the members 74, corresponding lips 80' and 81 being normally offset from each other.

A chute 82 is mounted below the base plate 76 to direct the coins toward the center of the device so that they may be caught in one hand.

The operation of our device is as follows:

In operating the form of our invention shown in Figures 1 to 10 inclusive, the fingers of the operator are placed beneath the lip 17 and the thumb placed in contact with one of the keys 28, depending upon the amount of change desired. According to the present showing of the device, depression of the lower key 28 cuts five pennies from the lower end of the stack farthest to the right. Depression of the second key 28 from the bottom, actuates the second coin cutting member from the right, which cuts one nickel from this stack, the first coin cutting member being actuated by contact with the second coin cutting member to cut off five pennies, change for a dime being thus obtained. Movement of any one of the coin cutting members actuates every coin cutting member to the right thereof. Thus if the uppermost key 28 is pressed, two twenty-five cent pieces will be cut from the first stack on the left, one twenty-five cent piece from the second stack, three nickels from the third stack, one nickel from the fourth stack, and five pennies from the fifth stack. Thus it will be seen that depression of the uppermost key may deliver change for one dollar, the second key change for a half dollar, the third key change for a quarter, the fourth key change for a dime, and the fifth key change for a nickel. It will be obvious that the device may be made to deliver whatever combination of coins may be desirable. When the coins are cut by the movement of the cutting members 19, they are moved to the right until they come into registration with the cutout portions 34 of the supporting members 32, whereupon they will drop into the chute 10 and be directed outwardly into the hand of the operator, without the operator removing his hand from the operating position.

The first modification of the device operates in a manner similar to that described, while in the form shown in Figures 22 and 23, the operator's thumb is placed on the outside of the lip 81 and his forefinger on the opposite side of the lip 80'. A slight gripping action of the thumb and forefinger will cut the coins from the bottom of the stack, dropping them through the opening 80 whereupon they will be delivered through the opening in the bottom of the coin chute 82. Operation of any of the lips 80' and 81 operates all of the coin cutting members to one side thereof, due to the contacting of the edges of the coin cutting member.

If desired, the coin cutting member for the penny containers of either form of the device may be arranged to deliver three pennies, so that a news boy may deliver change to a customer with the price of a newspaper deducted.

It is to be understood that while we have described the preferred embodiments of our invention, various changes in the shape, size, and arrangement of parts may be resorted to without departing from the spirit of the invention or the scope of the subjoined claims.

Having thus described our invention, what we claim is:

1. In a device of the character described, a set of alined coin containers, and a coin cutting element arranged adjacent each of said coin containers, said elements being arranged in and movable substantially in alinement with the axis of the set of containers and in contact with each other, the actuation of either of said elements being adapted to actuate the elements to one side thereof, each of said elements being movable independently of the elements at the opposite side.

2. In a device of the character described, a set of alined coin containers, a coin cutting element arranged adjacent each of said coin containers, said elements being arranged in and movable substantially in alinement with the axis of the set of containers and in contact with each other, the actuation of either of said elements being adapted to actuate the elements to one side thereof, each of said elements being movable independently of the elements at the opposite side, and a single spring adapted to maintain said cutting elements in the normal position.

3. In a device of the character described, a plurality of coin containing members, contacting movable coin cutting elements arranged below said coin containing members, and means for positively maintaining the coins within said containing members in a parallel contacting relation.

4. In a device of the character described, a plurality of coin containing members, means for supporting a coin stack within said members, a pair of fixed parallel bearing rods, and a plurality of contacting slidable coin cutting elements mounted adjacent said coin containing members, said cutting elements being provided with lips having alined openings therein to receive said bearing rods.

5. In a device of the character described, a plurality of coin containing members, means for supporting a coin stack within said members, contacting slidable coin cutting members arranged below said coin containing members, and means carried by said coin containing members for maintaining the coins in contacting parallel position.

6. In a device of the character described, a plurality of coin-containing members, contacting movable coin cutting elements, fixed transverse members mounted below said cutting members, and adjustable members for supporting a stack of coins within said containing member, said adjusting members being provided with arms having notches adapted to receive said fixed transverse members.

7. In a device of the character described, a plurality of coin containing members, contacting slidable coin cutting elements arranged below said containing members, means for actuating said slidable elements, said means including keys arranged outwardly of the casing, means for delivering coins in proximity to said keys and a lip carried by said delivery means adapted to be engaged by the fingers of the operator.

8. In a device of the character described, a plurality of coin containing members, contacting slidable coin cutting elements arranged below said containing members, a chute, including front and rear walls, end plates carried by said chute between said walls, one of said end plates being spaced above the bottom of the lower end of the chute and provided with openings, means mounted in said openings for actuating said coin cutting elements, and means for limiting the movement of said coin cutting elements in one direction.

9. In a device of the character described, a plurality of circularly arranged upstanding rods adapted to contain a coin stack therein, and a plate slidably mounted upon said rods and contacting with the uppermost coin in the stack, said plate having a bend therein arranged at one side of the center of said rods.

10. In a device of the character described, a plurality of circularly arranged upstanding rods adapted to contain a coin stack therein, and a plate slidably mounted upon said rods provided with elongated openings for the reception of said rods, said plate having a bend therein arranged at one side of the center of said rods, one end of said plate being arranged above the opposite end.

11. In a device of the character described, a set of alined coin containers, and a coin cutting element arranged adjacent each of said coin containers, said elements being arranged in and slidable in alinement with the axis of the set of containers and in contact with each other, the actuation of either of said elements being adapted to actuate the elements to one side thereof, each of said elements being movable independently of the elements at the opposite side.

12. In a device of the character described, a coin containing member, a coin cutting element mounted adjacent said coin containing member, said cutting member being provided with a pair of down-turned lips at each end thereof provided with openings, and a pair of fixed parallel bearing rods passing through the openings in the lips of said coin cutting elements.

13. In a device of the character described, a plurality of coin containing members, means for supporting a coin stack within said members, a pair of fixed parallel bearings rods, a plurality of contacting slidable coin cutting elements mounted adjacent said coin containing members, said cutting elements being provided on opposite sides with lips provided with openings adapted to receive said bearing rods, and a plurality of operating members adapted to contact with said lips to move said cutting members.

14. In a device of the character described, a plurality of coin containing members, a pair of fixed parallel bearing rods, a plurality of contacting slidable coin cutting elements mounted adjacent said coin containing members, said cutting elements being provided on opposite sides with lips having openings to receive said bearing rods, a fixed end plate provided with a series of superposed openings, and a plurality of operating members slidably mounted in said last named openings, said operating members being adapted to contact the lips of said cutting elements.

15. In a device of the charatcer described, a plurality of coin containing members, a pair of fixed parallel bearing rods, a plurality of contacting slidable coin cutting elements mounted adjacent said coin containing members, said cutting elements being provided with lips having openings adapted to receive said bearing rods, an end plate provided with a series of superposed openings, and a plurality of operating members slidably mounted in said last named openings, said operating members being provided on their inner ends with openings adapted to receive said bearing rods, the inner end of said operating members being adapted to contact with the lips of said coin cutting elements.

In testimony whereof we affix our signatures.

HERBERT A. WRENN.
JOHN X. PHILLIPS, Jr.